March 30, 1926.  1,578,889
T. H. HARRIS
LOCK WASHER AND NUT
Filed Dec. 18, 1925
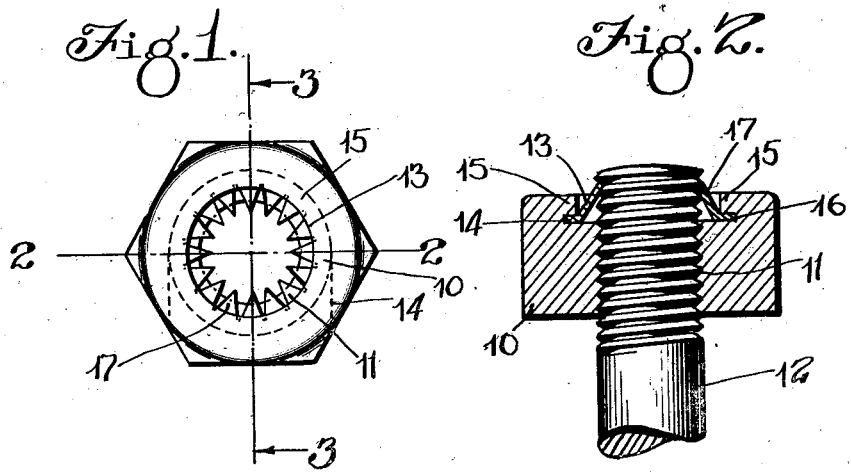
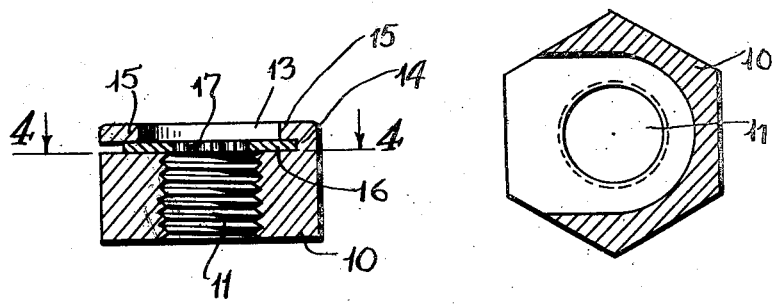
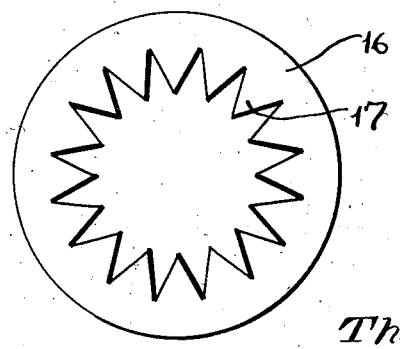
INVENTOR.
Thomas H. Harris.
BY
ATTORNEY Patented Mar. 30, 1926.

1,578,889

UNITED STATES PATENT OFFICE.

THOMAS H. HARRIS, OF RIVERTON, ILLINOIS.

LOCK WASHER AND NUT.

Application filed December 18, 1925. Serial No. 76,300.

*To all whom it may concern:*

Be it known that I, THOMAS H. HARRIS, a citizen of the United States, residing at Riverton, in the county of Sangamon and State of Illinois, have invented certain new and useful Improvements in Lock Washers and Nuts, of which the following is a specification.

This invention relates to lock nuts and has special reference to a nut adapted to be screwed on an ordinary bolt and there held against accidental displacement.

One object of the invention is to provide improvements in the general construction of devices of this character.

A second object of the invention is to provide an improved nut for this purpose having improved detachable locking means.

A third object of the invention is to provide an improved form of nut having an improved detachable locking element associated therewith and adapted to grip the threads of a bolt on which the nut may be screwed.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a top plan view of a nut and locking disk assembled in accordance with this invention.

Figure 2 is a section on the line 2—2 of Figure 1.

Figure 3 is a section on the line 3—3 of Figure 1 showing the nut on the bolt.

Figure 4 is a section on the line 4—4 of Figure 3 with the locking disk omitted.

Figure 5 is a plan or face view of the locking disk to an enlarged scale.

In carrying out the object of this invention there is provided an ordinary nut 10 which has the usual threaded bore 11 to receive the threaded end of a bolt 12.

The upper or outer face of this nut is provided with a recess 13 of greater diameter than the threaded bore and extending inwardly from one face of the nut. At the bottom of this recess is a slot 14 so positioned that an arcuate flange (terminating in straight flanges) 15 is formed above said slot at the upper end of the bore.

Also there is provided a locking disk 16 of annular formation and having on its inner periphery stellate teeth 17.

In use the locking disk is slipped, while flat, into the slot 14. Then the nut is screwed on the bolt which causes the stellate teeth to bend into the position shown in Figure 3 and holds the nut against accidental unscrewing.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In combination a nut having a threaded bore and a recess on its outer face of greater diameter than the bore, said nut also having a slot extending laterally therein between the bore and recess, and a normally flat locking disk slidable into said slot and of annular formation, said disk having bolt engaging teeth on its inner periphery.

2. In combination a nut having a threaded bore and a recess on its outer face of greater diameter than the bore, said nut also having a slot extending laterally therein between the bore and recess, and a normally flat locking disk slidable into said slot and of annular formation, said disk having bolt engaging teeth on its inner periphery, said teeth being of stellate formation and projecting normally over said bore, said teeth bending to raised positions upon the nut being screwed on a bolt.

In testimony whereof I affix my signature.

THOMAS H. HARRIS.